United States Patent
Naftel et al.

(10) Patent No.: US 8,495,741 B1
(45) Date of Patent: Jul. 23, 2013

(54) REMEDIATING MALWARE INFECTIONS THROUGH OBFUSCATION

(75) Inventors: Timothy M. Naftel, Longmont, CO (US); Mark K. Kennedy, Redondo Beach, CA (US); Adam L. Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1639 days.

(21) Appl. No.: 11/694,711

(22) Filed: Mar. 30, 2007

(51) Int. Cl.
G06F 21/00 (2006.01)

(52) U.S. Cl.
USPC ............. 726/24; 713/165; 713/187; 713/188; 713/189

(58) Field of Classification Search
USPC .......................................................... 726/24
See application file for complete search history.

(56) References Cited

U.S. PATENT DOCUMENTS

| | | | | |
|---|---|---|---|---|
| 6,240,530 | B1* | 5/2001 | Togawa ........................... | 714/38 |
| 2002/0144129 | A1* | 10/2002 | Malivanchuk et al. ....... | 713/188 |
| 2003/0046558 | A1* | 3/2003 | Teblyashkin et al. ......... | 713/188 |
| 2003/0212902 | A1* | 11/2003 | van der Made ............... | 713/200 |
| 2004/0187023 | A1* | 9/2004 | Alagna et al. ................. | 713/200 |
| 2005/0278785 | A1* | 12/2005 | Lieberman ...................... | 726/24 |
| 2006/0075494 | A1* | 4/2006 | Bertman et al. ................ | 726/22 |
| 2006/0294592 | A1* | 12/2006 | Polyakov et al. ............... | 726/24 |
| 2007/0022287 | A1* | 1/2007 | Beck et al. ..................... | 713/164 |
| 2007/0039048 | A1* | 2/2007 | Shelest et al. ................... | 726/22 |
| 2007/0079373 | A1* | 4/2007 | Gassoway ....................... | 726/22 |
| 2007/0113062 | A1* | 5/2007 | Osburn et al. ..................... | 713/1 |
| 2008/0005797 | A1* | 1/2008 | Field et al. ....................... | 726/24 |

OTHER PUBLICATIONS

Adelstein et al., Malicious code detection for open firmware, Dec. 2002, Proceedings of the 18th Annual Computer Security Applications Conference, pp. 403-412.*

King et al., SubVirt: implementing malware with virtual machines, May 2006, Proceedings of the 2006 IEEE Symposium on Security and Privacy, pp. 314-327.*

* cited by examiner

Primary Examiner — Taghi Arani
Assistant Examiner — Kenneth Chang
(74) Attorney, Agent, or Firm — Fenwick & West LLP

(57) ABSTRACT

A computer has a storage device that is infected with malicious software (malware). The malware uses stealth or rootkit techniques to hide itself in the storage device. A security module within the storage device detects the malware by comparing the files read from the storage device to those reported by the operating system. Upon detecting the malware, the security module prepares the computer for malware obfuscation by storing information describing the location of the malware, deploying an executable file, and configuring it to run on reboot. The executable file executes upon reboot and locates the data on the storage device associated with the malware. The executable file obfuscates the data so that the malware no longer loads at boot time, thereby disabling the rootkit technique. The computer reboots and the security module remediates the malware infection.

20 Claims, 3 Drawing Sheets

US 8,495,741 B1

REMEDIATING MALWARE INFECTIONS THROUGH OBFUSCATION

BACKGROUND

1. Field of the Invention

This invention pertains in general to protecting a computer from malicious software (malware) and in particular to techniques for removing rootkits and other malware that attempts to hide its presence.

2. Description of the Related Art

There is a wide variety of malicious software (malware) that can attack modern computers. Malware threats include computer viruses, worms, Trojan horse programs, spyware, adware, crimeware, and phishing websites. Certain classes of malware use "stealth" or "rootkit" techniques to hide themselves so that malware scanners, such as anti-virus and anti-spyware, cannot detect them and therefore cannot eradicate them. In some cases, the attacker uses a persistent storage area such as a registry or file system to help launch malware at boot time without user intervention. Such malware (or rootkit) infections that survive reboots are particularly difficult to remediate because they are not only evasive but also persistent.

Malware using rootkits install themselves on the operating system (OS) at boot time as drivers. The malware replaces vectors in all OS-based detection techniques to filter out data that describe the rootkit. For example, the malware manipulates the results of Windows file access API calls, such as FindFirstFile and FindNextFile, to remove all file entries corresponding to the rootkit. Thus, software that uses standard Windows APIs to traverse the file system is unable to enumerate malware-related files. Similarly, the malware typically hooks registry access and process-enumerating APIs in order to hide its presence. As a result, security software can have a difficult time detecting and remediating malware infections that use rootkit techniques to evade detection.

Accordingly, there is a need in the art for a way to detect and remediate malware infections that does not suffer from the drawbacks described above.

BRIEF SUMMARY OF THE INVENTION

The above and other needs are met by a method, system, and computer program product that remediates an infection of malicious software (malware) on a storage device of a computer. Embodiments of the method for remediating an infection of malware on a storage device, where the malware uses a rootkit technique to protect itself, include locating data on the storage device associated with the malware, obfuscating the data associated with the malware to disable the rootkit technique, booting the computer responsive to the obfuscation of the data, and remediating the malware infection responsive to the booting of the computer. Embodiments of the system and computer program product for remediating an infection of malware on a storage device, where the malware uses a rootkit technique to protect itself, include a malware data location module for locating data on the storage device associated with the malware, an obfuscation module for obfuscating the data associated with the malware to disable the rootkit technique, a reboot module for booting the computer responsive to the obfuscation of the data, and a remediation module for remediating the malware infection responsive to the booting of the computer.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
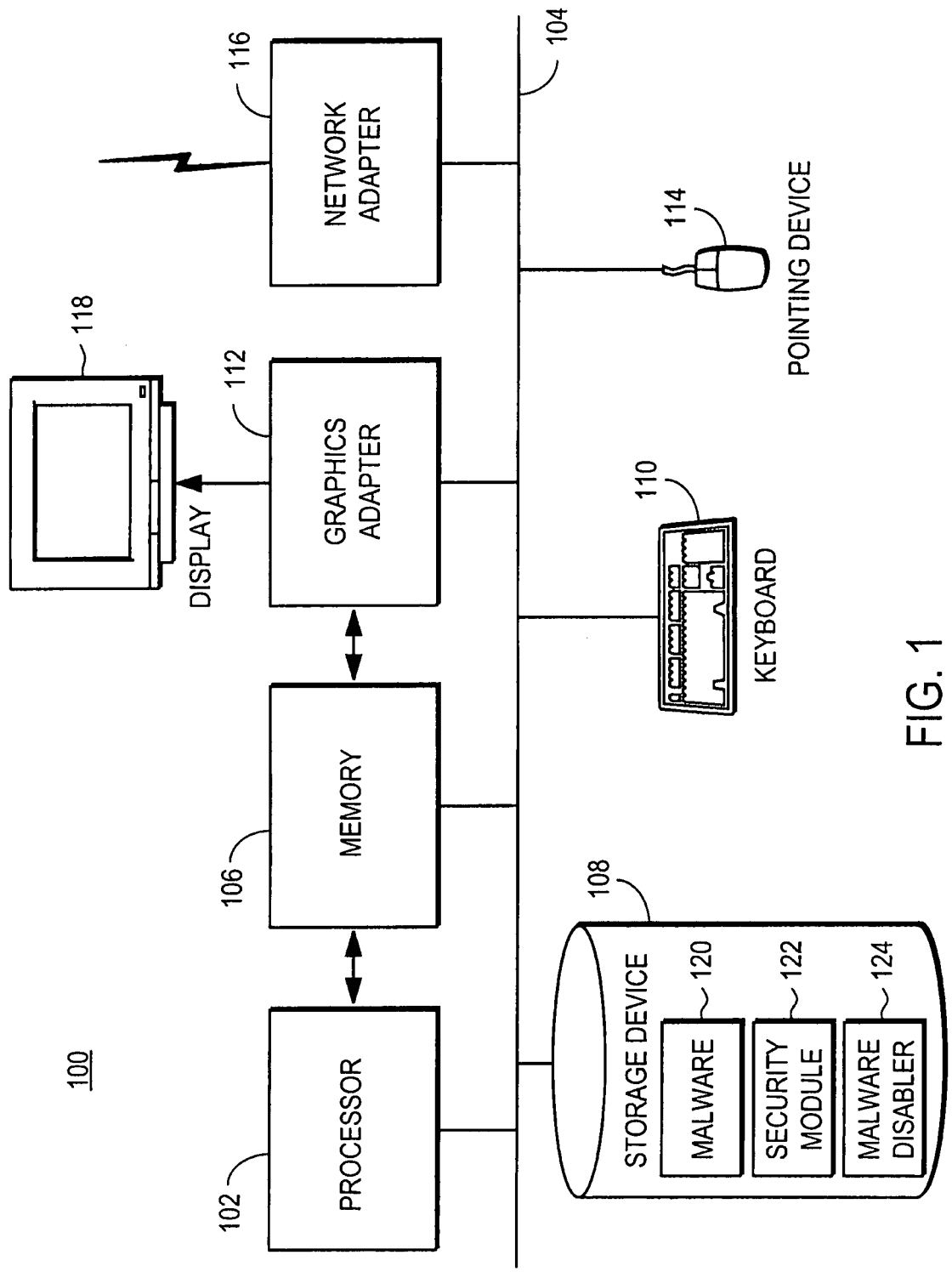
FIG. 1 is a high-level block diagram illustrating a computer using security software to remediate a malware infection according to one embodiment.

FIG. 1 is a high-level block diagram illustrating a computer 100 using a security module 122 to remediate a malware infection according to one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116 for communicating on a network. In one embodiment, the storage device 108 is a hard disk drive (disk) that holds executable code and/or data utilized during the operation of the computer 100. In other embodiments, the storage device 108 is a device such as a CD drive, DVD drive, or a flash memory device. The storage device 108 is depicted as containing a security module 122 that is deployed to remediate the malware infection, shown to be persisting within the storage device. A display 118 is coupled to the graphics adapter 112. The memory 106, in one embodiment, is a random access memory (RAM) and holds instructions and data loaded from the storage device 108, generated during processing, and/or from other sources.

The computer system 100 typically runs an operating system (OS), which is a set of programs intended to manage all the software and hardware resources on the computer system. Examples of operating systems include MICROSOFT WINDOWS, LINUX, or variants thereof. In one embodiment the OS also maintains and manages a registry, which is a database of system configuration settings accessed by computer users, applications, and hardware resources. In a typical use case, the OS refers to the registry to decide on which applications to run at boot time.

In one embodiment, the OS executes a subsystem that provides an operating environment for applications. For example, MICROSOFT WINDOWS provides a Win32 subsystem that provides a graphical user interface and other features utilized by many applications. Applications that execute on the computer 100 before the subsystem launches are referred to as "native mode" applications. While native mode applications cannot utilize features provided by the subsystem, the native mode applications generally have greater access to the underlying resources of the computer 100. Thus, device drivers and other applications that benefit from such access often run in native mode.

In one embodiment, the OS provides a file system for managing the files and other data stored on the storage device 108. Some file systems permit a single file on the storage device 108 to be associated with multiple independent data streams. For example, one stream could hold the normal file data, another stream could hold associated icons, and another stream could hold indexing information.

This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

FIG. 1 illustrates that malware 120 is resident on the storage device 108. Assume for purposes of this description that malware 120 uses rootkit techniques to hide itself. As used herein, a "rootkit technique" is a technique that prevents the malware from being detected and/or removed from the computer. Examples of rootkit techniques include replacing vectors in the OS in order to make it impossible to detect the files, registry entries, and processes associated with the malware through OS-provided API calls. A security module 122, executable on the computer 100, detects the malware 120 through an analysis of the storage device 108. In response, the security module 122 stores state information describing the malware 120 on the storage device 108, and also creates an executable file, called the "malware disabler" 124, on the storage device 108. Further, the security module 122 configures the OS of the computer to execute the malware disabler 124 on reboot. The security module 122 reboots the computer 100 and the malware disabler 124 executes and uses the state information to locate the malware 120. The malware disabler 124 obfuscates the malware 120 to prevent it from executing and thereby disables the rootkit technique. The malware disabler 124 then reboots the computer 100. Subsequently, the security module 122 remediates the malware infection.

Figure 2:
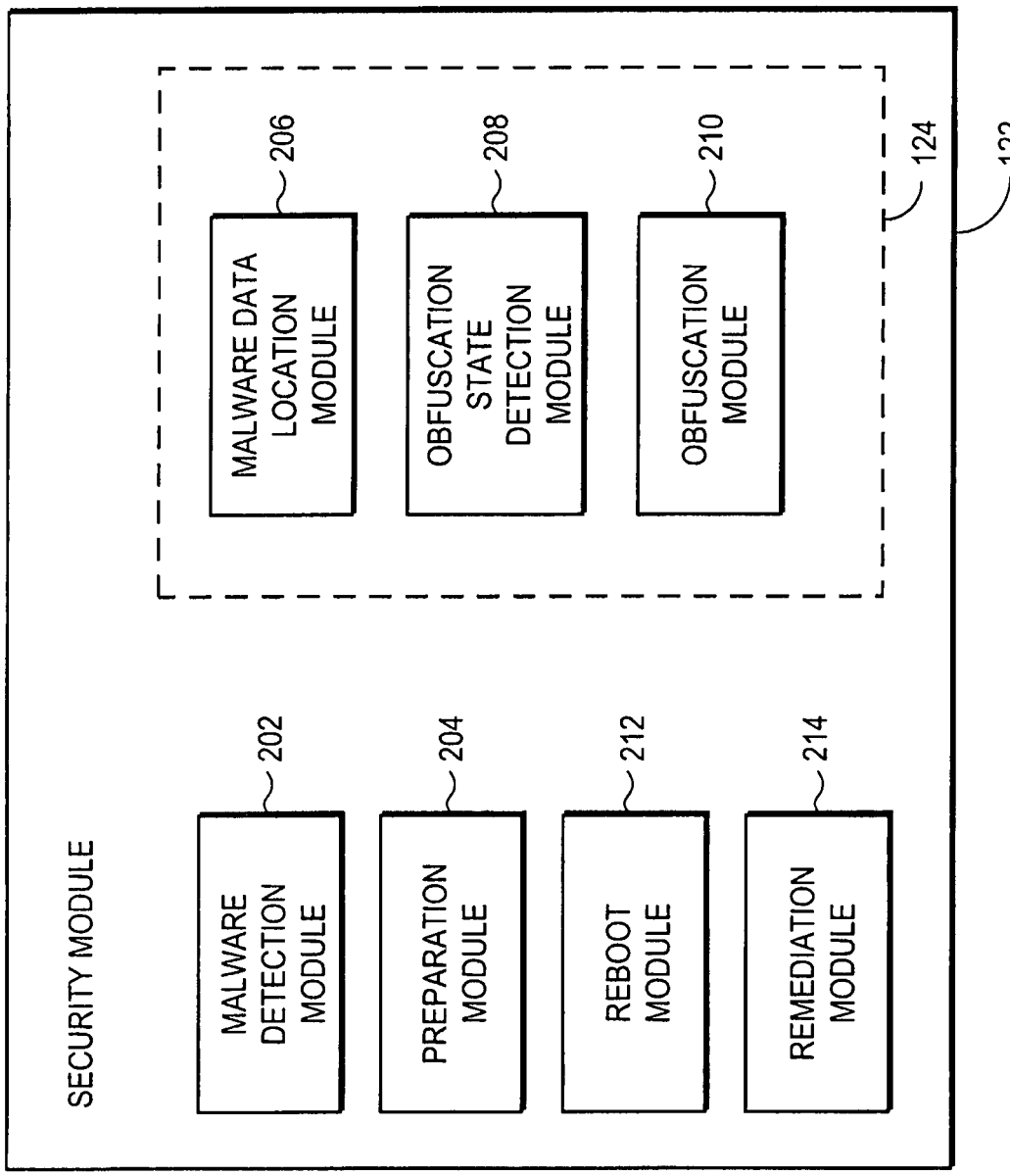
FIG. 2 is a high-level block diagram illustrating modules within the security module in the storage device according to one embodiment.

FIG. 2 is a high-level block diagram illustrating modules within the security module 122 in the storage device 108 according to one embodiment. Other embodiments can have different and/or additional modules than the ones shown in the figure. In addition, the functions can be distributed among the modules in a different manner than is described here.

In one embodiment, the security module 122 includes at least two components. The first component, simply referred to as the "security module" 122, detects malware 120 and remediates the infection. The second component, the malware disabler 124, disables the malware so that the security module 122 can perform the remediation. FIG. 2 shows the malware disabler 124 within the security module 122 because, in one embodiment, the malware disabler is extracted from the security module when needed. In other embodiments the security module 122 and malware disabler 124 are stored separately.

Turning first to the modules within the security module proper, a malware detection module 202 identifies the malware 120 that resides in the storage device 108. An embodiment of the malware detection module 202 detects malware 120 using rootkits and other hiding techniques by bypassing standard OS APIs and directly reading the storage device 108 to determine what files are present on it. In one embodiment, the malware detection module 202 also queries the OS about files present on the storage device 108. Any discrepancies between files found on the device 108 through the direct reads and files reported by the OS are exploited to identify the malware. In one embodiment, the malware detection module 202 identifies as potential malware 120 any files present on the storage device 108 that are not reported by the OS.

A preparation module 204 makes the necessary preparations to launch the malware disabler 124, following the detection of the malware 120 by the malware detection module 202. When the malware 120 is detected, an embodiment of the preparation module 204 extracts the malware disabler 124 from the security module 122 and stores it as an executable file in a designated location on the storage device 108. In an embodiment where the computer 100 executes the WINDOWS OS, the preparation module 204 stores the malware disabler in the "\WINDOWS\system32" directory. This directory is a standard location for storing device drivers and other native mode applications. This technique of "just-in-time" deployment of the malware disabler 124 minimizes the opportunity for malware 120 to detect and interfere with the malware disabler 124. Other embodiments deploy the malware disabler 124 at different times and/or using different techniques.

In addition, the preparation module 204 modifies the OS to cause the malware disabler 124 to execute upon booting the computer. In one embodiment, the preparation module 204 modifies the OS registry entry that specifies startup operations to cause the malware disabler 124 to execute upon boot. In a WINDOWS embodiment, the preparation module 204 modifies the BootExecute registry entry to cause the malware disabler 124 to execute as a native mode application.

Further, an embodiment of the preparation module 204 creates registry entries describing the location of the malware 120 and/or other relevant information. In one embodiment, the preparation module 204 encrypts the registry entries describing the malware. This encryption prevents the malware 120 from detecting and/or manipulating the registry entries.

A reboot module 212 reboots the computer system 100 when called by the other modules in the security module 122 and/or malware disabler 124. In one embodiment, the functionality of the reboot module 212 is provided by an OS API call. Thus, the reboot module 212 merely calls the OS API call that initiates a reboot process on the computer 100.

A remediation module 214 remediates the malware infection (e.g., removes the malware 120). In one embodiment, the remediation module 214 executes after the malware disabler 124 completes its obfuscation operations on the malware 120. The obfuscation causes the malware 120 to fail to execute and thereby disables the rootkit technique. In one embodiment, the remediation module 214 reads streams of data created by the malware disabler 124 that describe the obfuscation actions performed by the malware disabler 124. Since the malware is now exposed to the OS, the remediation module 214 can use normal techniques such as OS system calls to verify that the files are, in fact, malware and remove the files, directory entries, and other associated data. The remediation module 214 then deletes the malware disabler 124 and thereby erases its "footprint."

Further, an embodiment of the remediation module 214 "cleans up" by removing files, registry entries, and/or other data involved in the malware obfuscation operation. Thus, the remediation module 214 removes the malware disabler 124 from the storage device 108 and removes the registry entries instructing the OS to execute it. In addition, the remediation module 214 removes the registry entries describing the location of the malware and any other data that are used solely during the obfuscation operation.

As mentioned above, an embodiment of the malware disabler 124 is a native mode application. The OS executes the malware disabler 124 before loading the Win32 subsystem. As a result, the malware disabler 124 is not subject to interference caused by the malware's rootkit.

Turning now to the modules within the malware disabler 124, a malware data location module 206 locates files and/or other data on the storage device 108 that are associated with the detected malware. In one embodiment, the malware data location module 206 reads the registry entries created by the preparation module 204 and identifies the files associated with the malware 120.

In one embodiment, the malware data location module 206 finds the files by first locking the storage device 108 to prevent any other processes from altering it. The malware data location module 206 reads the native Master File Table (MFT) on the storage device 108 to identify the disk structures, directory trees, and individual files within these trees. The malware data location module 206 traverses the MFT to find the files of the suspected malware 120. Then, the malware data location module 206 identifies the actual data in the storage device 108 corresponding to the files of the malware 120. The malware data location module 206 then passes on information describing the location of malware files to the obfuscation module 210.

An obfuscation state detection module 208 determines the state of malware obfuscation, i.e. whether the malware disabler 124 has already obfuscated the malware 120. In one embodiment, the obfuscation state detection module 208 examines alternate data streams of the malware disabler file, if any, to determine whether a data stream indicates that the malware is already obfuscated. If the malware 120 is obfuscated, the obfuscation state detection module 208 causes the malware disabler 124 to terminate execution.

An obfuscation module 210 obfuscates data associated with the malware 120 as identified by the malware data location module 206. In one embodiment, the obfuscation module 210 alters the malware 120 to an extent sufficient to cause the OS to fail to execute it. In a typical case where the malware 120 is formed of one or more executable files, the obfuscation module 210 alters the executable file in a way that makes it not executable. In one embodiment, the obfuscation is a reversible technique which allows the obfuscation to be removed if necessary or desired.

The obfuscating techniques used by the obfuscation module 210 can vary in different embodiments. Generally, the obfuscation module 210 reads data from the file or files forming the malware 120, alters the data, and writes the altered data back to the same locations. In one embodiment, the obfuscation module 210 applies a rolling exclusive-or (XOR) operation to the malware file data. In another embodiment, the obfuscation module 210 replaces the file data with a stub executable that simply exits when executed. In another embodiment, the obfuscation module 210 swaps file clusters. In yet another embodiment, the obfuscation module 210 shifts the file cluster data. Other embodiments can perform other variations of these techniques and/or use different techniques.

In one embodiment, the obfuscation module 210 writes data describing the results of the obfuscation to an alternate stream of the malware disabler 124. These data permit the obfuscation to be reversed and allow other modules to determine whether the obfuscation was performed. Thus, the data in the alternate stream can describe the range of data to which the XOR operation was applied, can include copies of overwritten data, can describe data swaps or shifts that were performed, etc. In one embodiment, the data in the alternate data stream are used by the obfuscation state detection module 208 and the remediation module 214 to determine whether the obfuscation module 210 has previously obfuscated the malware.

Figure 3:
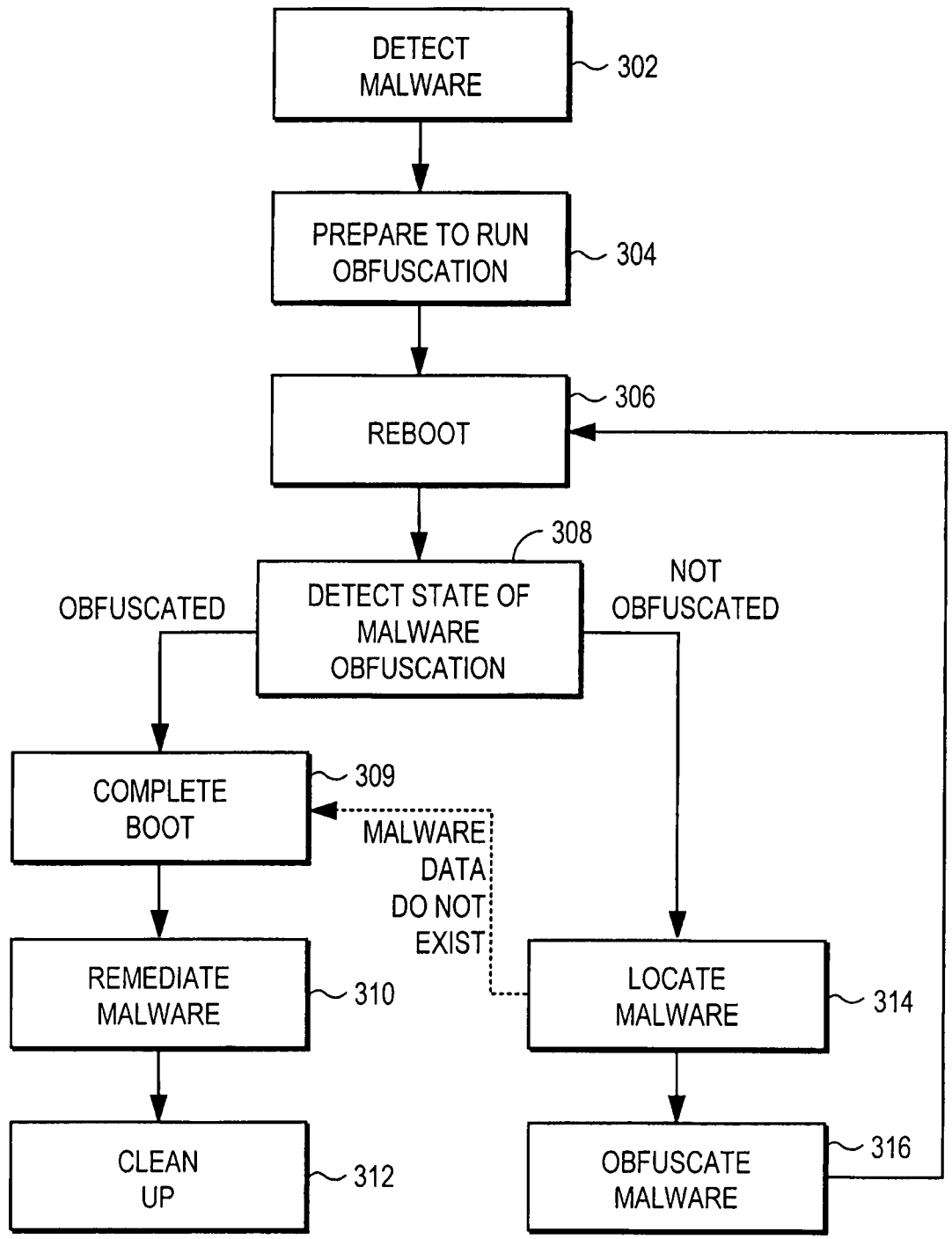
FIG. 3 is a flowchart showing a method of detecting and obfuscating malware according to one embodiment.

FIG. 3 is a flowchart showing a method of detecting and obfuscating malware according to one embodiment. Other embodiments perform different and/or additional steps than the ones described here. Moreover, other embodiments perform the steps in different orders.

Initially, the security module 122 detects 302 the presence of malware 120. In one embodiment, the malware uses rootkit techniques to hide itself in the storage device 108. The security module 122 detects the malware by identifying files through direct reads of the storage device 108 that are not reported by the OS. Upon detecting the malware 120, the security module 122 prepares 304 the computer 100 for malware obfuscation operations by creating registry entries describing the location of the malware, deploying the malware disabler 124, and configuring the OS to execute it upon reboot. The security module 122 reboots 306 the computer 100. The computer 100 executes the malware disabler 124 in the native mode prior to launching the Win32 subsystem. The malware disabler 124 detects 308 the state of obfuscation, i.e. whether the malware was previously obfuscated, by reading any alternate streams of the malware disabler 124 to determine whether the streams store data describing prior obfuscation operations.

If the malware 120 has not been obfuscated, the malware disabler 124 locates 314 the malware 120 by first identifying the malware 120 from the registry entries and then traversing the MFT to locate the specific files associated with the malware 120. The malware disabler 124 then obfuscates 316 the malware files, records data describing the obfuscation in an alternate data stream of the malware disabler file, and reboots 306 the computer 100. If the malware disabler 124 is unable to locate 314 the specific files associated with the malware 120 because the files do not exist, the malware disabler terminates execution and allows the computer to complete 309 the boot normally. If upon reboot the malware disabler 124 determines that the malware 120 has already been obfuscated, the malware disabler terminates execution and allows the computer to complete 309 the boot normally. The security module 122 remediates 310 the malware infection by removing the files and/or other data associated with the malware 120. The security module 122 also cleans up 312 by deleting the malware disabler 124, removing the registry entries that identified the malware, and/or performing related actions.

While the techniques for remediating malware are described above in the context of a physical storage device 108, the same techniques can be applied to remove malware from a virtual storage device of a virtual machine (VM). In a typical VM implementation, the environment of the VM is encapsulated in a file. For example, a virtual machine implementation from VMWARE uses a Virtual Machine Disk Format (VMDK) file that specifies the VM environment. The VMDK file is further used to boot the VM.

In one embodiment, the security module 122 is executed by the VM and detects malware 120 within the VM environment using the techniques described above. The malware disabler 124, however, is executed external from the VM and analyzes the VM disk file while the VM is not executing. The malware disabler 124 uses the techniques described above to analyze the VM file directly to identify and obfuscate the malware. In this VM embodiment, the malware disabler 124 need not lock the disk for reading and can store data describing the obfuscation in places other than an alternate data stream. Once the malware 120 is obfuscated, the VM is booted so that the security module 122 within the VM can remediate the malware infection.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method for remediating an infection of malware on a storage device of a computer, the malware using a rootkit technique to protect itself, comprising:
   locating data on the storage device associated with the malware;
   storing encrypted information describing the location of the data associated with the malware on the storage device of the computer in a registry maintained by an operating system of the computer;
   configuring the computer to execute an executable file adapted to obfuscate the data associated with the malware upon boot;
   booting the computer responsive to configuring the computer, the booting causing the executable file to execute and use the stored information to:
   determine whether the data associated with the malware are previously obfuscated; and
   if the data associated with the malware are not previously obfuscated, obfuscate the data associated with the malware to prevent the malware from executing by altering the data associated with the malware using a reversible technique and storing obfuscation data enabling reversal of the alteration to an alternate stream of the executable file; and
   remediating the infection of malware responsive to the obfuscation.

2. The method of claim 1, wherein altering the data associated with the malware comprises:
   performing a rolling exclusive-or (XOR) operation on at least a subset of the data.

3. The method of claim 1, wherein determining whether the data associated with the malware are previously obfuscated comprises:
   detecting whether the alternate stream of the executable file stores data which indicate that the data associated with the malware are previously obfuscated.

4. The method of claim 1, wherein the data on the storage device associated with the malware are within a file describing a virtual machine environment and wherein the booting comprises:
   booting the file describing the virtual machine environment within a virtual machine.

5. The method of claim 1, wherein the booting causes the executable file to execute in a native mode of the computer in which the executable file is not subject to interference from the rootkit technique of the malware.

6. The method of claim 1, wherein obfuscating the data associated with the malware comprises altering at least some of the data associated with the malware at the described location on the storage device.

7. The method of claim 1, wherein remediating the infection of malware comprises:
   reading the obfuscation data describing the obfuscation of the data associated with the malware from the alternate stream of the executable file; and
   removing the data associated with the malware from the storage device responsive to the obfuscation data.

8. A system for remediating an infection of malware on a storage device of a computer, the malware using a rootkit technique to protect itself, comprising:
   a processor for executing computer program modules; and
   a non-transitory computer readable medium storing executable computer program modules comprising:
   a malware data location module for locating data on the storage device associated with the malware;
   a preparation module for storing encrypted information describing the location of the data associated with the malware on the storage device of the computer in a registry maintained by an operating system of the computer and configuring the computer to execute an executable file adapted to use an obfuscation module to obfuscate the data associated with the malware upon boot;
   a reboot module for booting the computer responsive to configuring the computer, the booting causing the executable file to execute and use the stored information and causing the obfuscation module to use the stored information to:
   determine whether the data associated with the malware are previously obfuscated; and
   if the data associated with the malware are not previously obfuscated, obfuscate the data associated with the malware to prevent the malware from executing by altering the data associated with the malware using a reversible technique and storing obfuscation data enabling reversal of the alteration to an alternate stream of the executable file; and
   a remediation module for remediating the infection of malware responsive to the obfuscation.

9. The system of claim 8, wherein determining whether the data associated with the malware are previously obfuscated comprises detecting whether the alternate stream of the executable file stores data which indicate that the data associated with the malware are previously obfuscated.

10. The system of claim 8, wherein altering the data associated with the malware comprises:
    performing a rolling exclusive-or (XOR) operation on at least a subset of the data.

11. The system of claim 8, wherein the data on the storage device associated with the malware are within a file describing a virtual machine environment and wherein the booting further causes the file describing the virtual machine environment to boot within a virtual machine.

12. The system of claim 8, wherein the booting further causes the executable file to execute in a native mode of the computer in which the executable file is not subject to interference from the rootkit technique of the malware.

13. The system of claim 8, wherein obfuscating the data associated with the malware comprises altering at least some of the data associated with the malware at the described location on the storage device.

14. The system of claim 8, wherein remediating the infection of malware comprises:
    reading the obfuscation data describing the obfuscation of the data associated with the malware from the alternate stream of the executable file; and
    removing the data associated with the malware from the storage device responsive to the obfuscation data.

15. A non-transitory computer-readable medium having executable computer program modules embodied therein for remediating an infection of malware on a storage device of a computer, the malware using a rootkit technique to protect itself, the modules comprising:
    a malware data location module for locating data on the storage device associated with the malware;
    a preparation module for storing encrypted information describing the location of the data associated with the malware on the storage device of the computer in a registry maintained by an operating system of the computer and configuring the computer to execute an executable file adapted to use an obfuscation module to obfuscate the data associated with the malware upon boot;

a reboot module for booting the computer responsive to configuring the computer, the booting causing the executable file to execute and causing the obfuscation module to use the stored information to:

determine whether the data associated with the malware are previously obfuscated; and if the data associated with the malware are not previously obfuscated, obfuscate the data associated with the malware to prevent the malware from executing by altering the data associated with the malware using a reversible technique and storing obfuscation data enabling reversal of the alteration to an alternate stream of the executable file;

a remediation module for remediating the infection of malware responsive to the obfuscation.

16. The non-transitory computer-readable medium of claim 15, wherein determining whether the data associated with the malware are previously obfuscated comprises detecting whether the alternate stream of the executable file stores data which indicate that the data associated with the malware are previously obfuscated.

17. The non-transitory computer-readable medium of claim 15, wherein the data on the storage device associated with the malware are within a file describing a virtual machine environment and wherein the booting further causes the file describing the virtual machine environment to boot within a virtual machine.

18. The non-transitory computer-readable medium of claim 15, wherein the booting further causes the executable file to execute in a native mode of the computer in which the executable file is not subject to interference from the rootkit technique of the malware.

19. The non-transitory computer-readable medium of claim 15, wherein obfuscating the data associated with the malware comprises altering at least some of the data associated with the malware at the described location on the storage device.

20. The non-transitory computer-readable medium of claim 15, wherein remediating the infection of malware comprises:

reading the obfuscation data describing the obfuscation of the data associated with the malware from the alternate stream of the executable file; and removing the data associated with the malware from the storage device responsive to the obfuscation data.

* * * * *